No. 654,741. Patented July 31, 1900.
H. W. LIBBEY.
MOTOR VEHICLE.
(Application filed Aug. 24, 1899.)
(No Model.)

Witnesses.
Robert Everett.
H B Keefe

Inventor.
Hosea W. Libbey.
By James L. Norris
Atty.

UNITED STATES PATENT OFFICE.

HOSEA W. LIBBEY, OF BOSTON, MASSACHUSETTS.

MOTOR-VEHICLE.

SPECIFICATION forming part of Letters Patent No. 654,741, dated July 31, 1900.

Application filed August 24, 1899. Serial No. 728,346. (No model.)

*To all whom it may concern:*

Be it known that I, HOSEA W. LIBBEY, a citizen of the United States, residing at Boston, in the county of Suffolk and State of Massachusetts, have invented new and useful Improvements in Motor-Vehicles, of which the following is a specification.

My invention relates to motor-vehicles, the same residing particularly in the means for mounting the vehicle-body on the axles and in an improved construction of steering mechanism.

The invention consists of a pair of axles on which the supporting-wheels are mounted, a vehicle-body, and semi-elliptical springs attached to and having a sliding connection with said axles at their ends and engaging the body at intermediate points.

The invention also consists of an upright rod or standard secured to the center of the forward axle, extending through the fifth-wheel and guided thereby, a steering-lever, and connections between said steering-lever and the said upright rod.

The invention also consists in certain details of construction and combinations of parts, which will be hereinafter more fully described and claimed.

Figure 1:
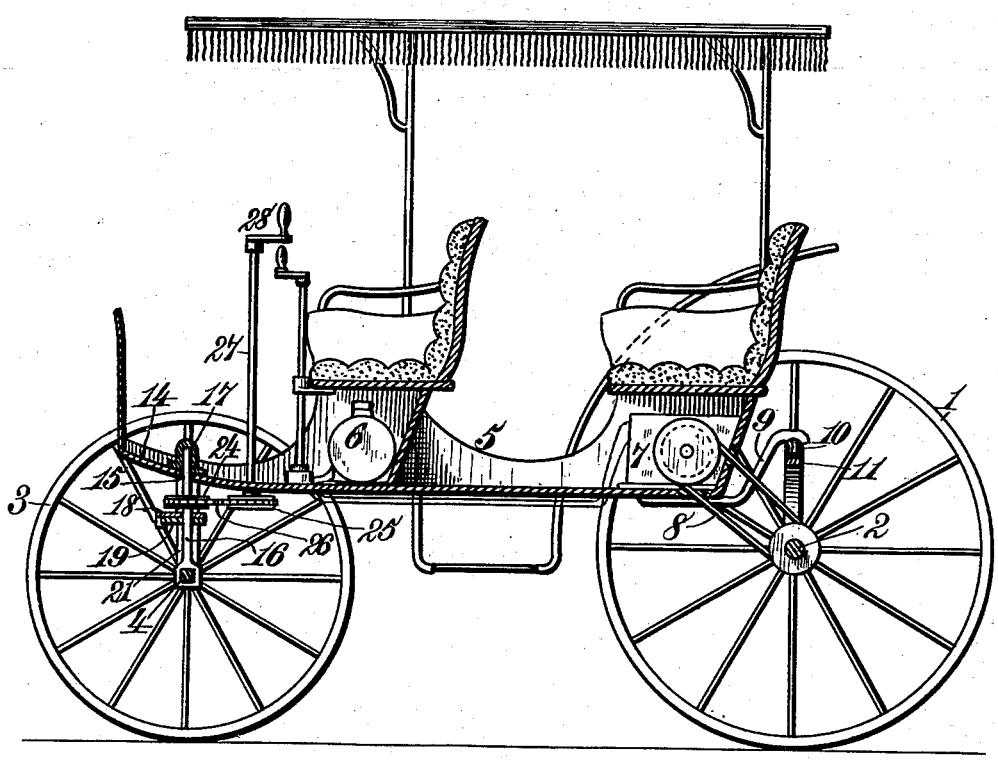
Figure 2:
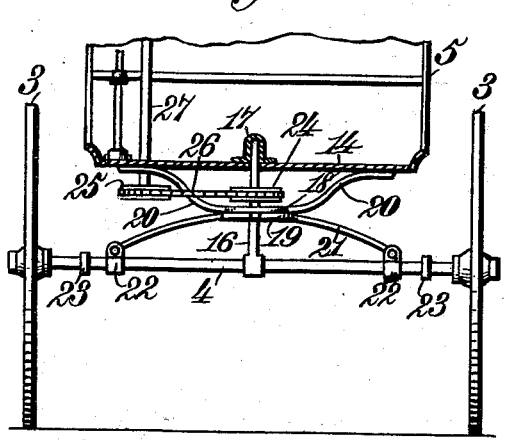
Figure 3:
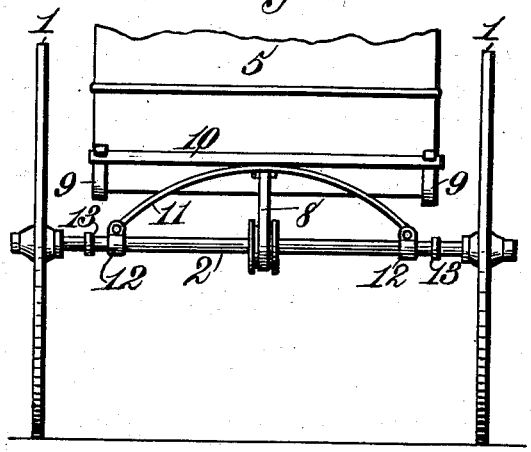

In the drawings forming part of this specification, Figure 1 is a sectional side elevation of a vehicle embodying my invention. Fig. 2 is a front elevation of the same, and Fig. 3 is a rear elevation.

Like reference-numerals indicate like parts in the different views.

The rear wheels 1 of the vehicle are secured to the axle 2, and the front wheels 3 of the vehicle are loose upon the forward axle 4. The body 5 is supported upon the axles 2 and 4 in a manner which will be described later and has secured beneath one of the seats thereof a battery 6, connected with a motor 7, preferably located beneath the other seat. Suitable connections, as belts or chains 8, are provided between the armature-shaft of the motor 7 and the rear axle 2. In this way the vehicle is driven from the motor 7. It is of course obvious that any form of battery or motor can be employed and that any means of connection between the motor and the driving-axle of the vehicle may be substituted for that shown.

Secured to the body 5 and extending rearwardly and upwardly therefrom are arms 9, which are connected at their extremities by a cross-bar 10. This cross-bar is engaged on its under side by an intermediate portion of a semi-elliptical spring 11, which is connected to the rear axle 2 by means of slide-blocks 12, which permit of the expansion and contraction of said spring and provide a resilient or yielding support for the body 5. Stops 13, secured to the axle 2, are provided for preventing too great lateral movement of the blocks 12 on said axle.

The foot-board 14 of the body extends slightly beyond the forward axle 4 and is provided with an opening 15, through which extends an upright rod or standard 16, secured to the front axle 4. The upper end of the rod 16 is covered and protected by a cap 17, which provides for the raising and depressing of the body 5 independent of the axle. The rod 16 extends through the upper and lower parts 18 and 19 of the fifth-wheel and is guided thereby. The upper part 18 of the fifth-wheel is supported upon curved rods or springs 20, secured to the under side of the foot-board 14, and the lower part 19 of said fifth-wheel is attached to or formed integral with a semi-elliptical spring 21, mounted upon the forward axle 4 in a manner similar to the mounting of the spring 11 upon the rear axle 2—that is, the spring 21 is provided with slide-blocks 22, which embrace the axle 4 and have their lateral movements limited by the stops 23, fixed to the axle 4. On the upright rod 16, above the fifth-wheel, is a sprocket-wheel 24, around which and the sprocket-wheel 25 passes a sprocket-chain 26. The sprocket-wheel 25 is secured to the lower end of the steering-rod 27, having the crank or operating lever 28 upon its upper end.

From the foregoing description it will be seen that I have provided a novel means of resiliently supporting a vehicle-body upon the axles of the vehicle and novel means whereby a motor-vehicle may be steered from the seat of the vehicle. It will be understood, of course, that the crank 28 on the steering-rod 27 is located within easy reach of the operator on the front seat of the vehicle and that by turning said crank or handle in one direction or the other the movement thereby imparted to the steering-rod 27 will be transmitted through the sprocket-wheel 25, sprocket-chain 26, and sprocket-wheel 24 to the front axle 4 of the vehicle.

Having now described my invention, what I claim, and desire to secure by Letters Patent of the United States, is—

1. In a vehicle, the combination with the front and rear axles thereof and the body, of curved springs supporting said body, and slides surrounding said axles and pivoted to said springs.

2. In a vehicle the combination with the axles thereof and the body, of semi-elliptical springs on which said body is supported, and sliding blocks on said axles secured to the ends of said springs, as and for the purpose set forth.

3. In a vehicle the combination with the axles thereof and the body, of semi-elliptical springs upon which the body is supported, slide-blocks on said axles secured to the ends of said springs, and stops for limiting the lateral movements of said blocks, as and for the purpose set forth.

4. In a vehicle the combination with the axles and the body thereof, the latter having an opening in its footboard, of an upright rod secured to the forward axle and extending through said opening, a cap secured to said body surrounding said opening and inclosing the upper end of said rod, a rotatable steering-rod having a crank or handle thereon, sprocket-wheels mounted, respectively, on said upright and steering rods, and a sprocket-chain connecting said sprocket-wheels, as and for the purpose set forth.

5. In a vehicle the combination with the axles and the body thereof, the latter having an opening in its footboard, of a fifth-wheel connection between the body and the forward axle, the lower part of said fifth-wheel being mounted upon a spring on said forward axle, an upright rod secured to the forward axle extending through said fifth-wheel and through the opening in said footboard, a rotatable steering-rod extending through the body and having a crank or handle upon its upper end within reach of the operator, sprocket-wheels mounted, respectively, on said upright and steering rods, and a sprocket-chain connecting said sprocket-wheels, as and for the purpose set forth.

In testimony whereof I have hereunto set my hand in presence of two subscribing witnesses.

HOSEA W. LIBBEY.

Witnesses:
CHAS. STEERE,
WINIFRED G. KERWIN.